United States Patent [19]
Sole

[11] Patent Number: 5,987,333
[45] Date of Patent: Nov. 16, 1999

[54] COMMUNICATIONS POWER CONTROL

[75] Inventor: Geoffrey Charles Sole, Bishops Stortford, United Kingdom

[73] Assignee: Nortel Networks Corporation/Corporation Nortel Networks, Montreal, Canada

[21] Appl. No.: 08/940,510

[22] Filed: Sep. 30, 1997

[51] Int. Cl.$^6$ ............................... H04B 7/00; H04B 1/00; H04Q 7/20

[52] U.S. Cl. ............................................. 455/522; 455/69

[58] Field of Search ........................... 455/522, 69, 67.3, 455/574, 126, 38.3

[56] References Cited

U.S. PATENT DOCUMENTS

| | | | |
|---|---|---|---|
| 4,777,653 | 10/1988 | Bonnerot et al. | 455/69 |
| 5,003,619 | 3/1991 | Morris et al. | 455/127 |
| 5,086,508 | 2/1992 | Furuno | 455/69 |
| 5,128,965 | 7/1992 | Henrikson | 375/58 |
| 5,129,098 | 7/1992 | McGirr et al. | 455/69 |
| 5,241,690 | 8/1993 | Larsson et al. | 455/69 |
| 5,566,165 | 10/1996 | Sawahashi et al. | 445/38.3 |
| 5,812,938 | 9/1998 | Gilhousen et al. | 445/69 |

FOREIGN PATENT DOCUMENTS

| | | | |
|---|---|---|---|
| 0 687 075 A2 | 12/1995 | European Pat. Off. | H04B 7/005 |
| WO 95/08876 | 3/1995 | WIPO | H04B 7/005 |
| WO 96/31014 | 10/1996 | WIPO | 7/5 |

OTHER PUBLICATIONS

Hanly, "Capacity and Power Control in Spread Spectrum Macrodiversity Radio Networks," *IEEE Transactions on Communications*, Feb. 1996.

Kim et al., "Efficient Distributed Power Control for Cellular Mobile Systems," *IEEE Transactions on Vehicular Technology*, May 1997.

Yates, "A Framework for Uplink Power Control in Cellular Radio Systems," *IEEE Journal on Selected Areas in Communications*, Sep. 1995.

Foschini et al., "Distributed Autonomous Wireless Channel Assignment Algorithm with Power Control," *IEEE Transactions on Vehicular Technology*, Aug. 1995.

Frodigh, "Performance Bounds for Power Control Supported DCA–Algorithms in Highway Micro Cellular Radio Systems," *IEEE Transactions on Vehicular Technology*, May 1995.

Lee et al., "Downlink Power Control Algorithms for Cellular Radio Systems," *IEEE Transactions on Vehicular Technology*, Feb. 1995.

Chuang et al., "Performance of Autonomous Dynamic Channel Assignment and Power Control for TDMA/FDMA Wireless Access," *IEEE Journal on Selected Areas in Communications*, Oct. 1994.

Ariyavisitakul, "Achievable Performance of Autonomous SIR–Based Power Control," *Electronics Letters*, Apr. 15, 1993.

Viterbi et al., "Performance of Power–Controlled Wideband Terrestrial Digital Communication," *IEEE Transactions on Communications*, Apr. 1993.

Zander, "Distributed Cochannel Interference Control in Cellular Radio Systems," *IEEE Transactions on Vehicular Technology*, Aug. 1992.

*Primary Examiner*—Dwayne D. Bost
*Assistant Examiner*—Raymond B. Persino
*Attorney, Agent, or Firm*—Chapman and Cutler

[57] ABSTRACT

Multichannel communications method and system wherein transmit power is controlled for each channel to achieve progressive approach towards a preset or given minimum of signal (or carrier) to noise plus interference ratio (SNIR) for any active channel concerned. Progression is by steps from frame to frame of transmissions according to signals as received in the previous frame and scaling of difference between reciprocals of previous frame actual and preset or given minimum SNIRs.

16 Claims, 2 Drawing Sheets

COMMUNICATIONS POWER CONTROL

FIELD OF THE INVENTION

This invention relates to multiple access communication systems such as used in cellular radio telephone systems and has particular reference to control of signal transmission power.

BACKGROUND TO THE INVENTION

Fading of transmitted signals can be a serious problem in cellular radio telephone systems. Intermittent loss of signal, even losing connections altogether, can result. Practical system capacity at any time is also important, and can be adversely affected at least temporarily by overall limit on transmit power and bandwidth. It is not sensible or practical to consider driving every available communications channel always at a power level sufficient to satisfy weakest possible transmission. Prior approaches to appropriate power control have included monitoring signals within a subscriber's channel relative to a predefined signal strength above which a base station will command reduction of transmitting power by subscriber equipment concerned. Unfortunately, such approach can actually contribute to signal degradation. Thus, if transmitting power is so reduced when it is wholly or mainly power of interference content that has increased, the signal (or carrier) to noise-plus-interference ratio (SNIR) will be made yet worse. Another approach has been to accept as inevitable that some connections will always be at risk, and, whether relative to indication of actual SNIR or otherwise, simply to seek to limit the channels at risk to a small percentage, say 10% or less, typically so that the majority, say 90% or more, are viable, i.e. at least effectively have SNIR above a given minimum value. Ordinarily, normal spread of actual SNIR values will mean that most channels are well above such given minimum value, and it is an object of this invention to provide power control with such channels closer to such given minimum value, so that at least some channels previously below SNIR threshold may attain an SNIR above threshold due to overall reduction in interference levels.

SUMMARY OF THE INVENTION

According to one aspect of this invention, there is provided a multichannel communications system having transmit power control provision(s) affording progressive approach towards a preset or given minimum of signal (or carrier) to noise plus interference ratio (SNIR) for each active channel, preferably in steps from frame to frame of system transmissions, and for each frame dependent on signals as received in the previous frame.

Such progressive adjustment of transmit power from frame to frame is conveniently and advantageously deliberately always by less than full difference between received SNIR and said given minimum, preferably a scaling of difference between reciprocals of previous frame actual and preset or given minimum SNIRs, the scaling factor being not greater than the said preset or given minimum value, thus to give desired convergence towards achieving proximity with and tracking of said minimum. It will be appreciated that both of said preset or given minimum SNIR and scaling factor may be varied and selected according to desired effectiveness, for example adjusted according to compromise between desired convergence rate and temporal variability of channels.

Such preferred power control technique relying only on a selectively weighted error signal to determine power in each frame according to SNIR in the previous frame and a prescribed minimum SNIR is applicable to any or all of communicating systems based on frequency division multiple access (FDMA) or time division multiple access (TDMA) or code division multiple access (CDMA).

Moreover, such power control technique is achievable equally well on so-called "up-link" (or transmission from subscriber to cell base station) or "down-link" (from cell base station to subscriber).

In one particular embodiment, digital signal information is demodulated at either, preferably both, of a cell base station and a subscriber unit, and an estimation of SNIR made in each frame (for use in power control for the next frame), say by reference relative to the constellation point related to each demodulated symbol. Some indication relevant to SNIR, preferably an adjustment to power level, is then encoded together with any other control and data, digitally modulated and transmitted to the relevant subscriber unit for digital demodulation and use of relevant control bits to adjust subscriber transmit power for the next frame.

BRIEF DESCRIPTION OF THE DRAWING

Specific implementation will now be indicated and described, by way of example, with reference to the accompanying diagrammatic drawings in which.

SPECIFIC EMBODIMENT OF THE INVENTION

Figure 1:
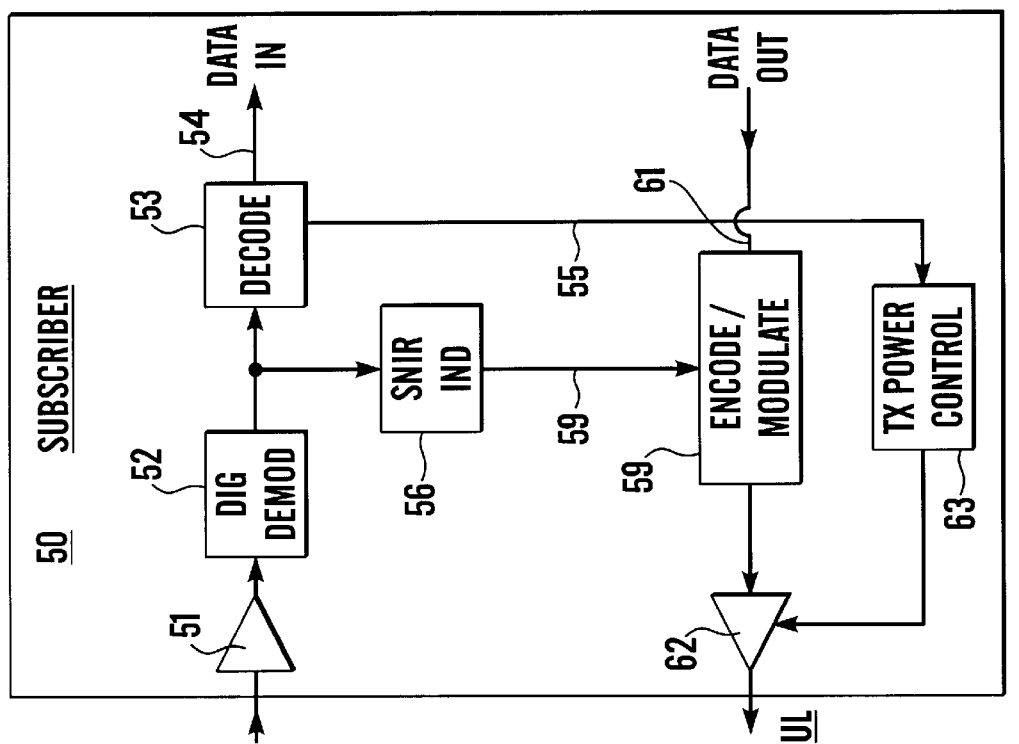
FIG. 1 is an outline block circuit diagram.
Figure 1:
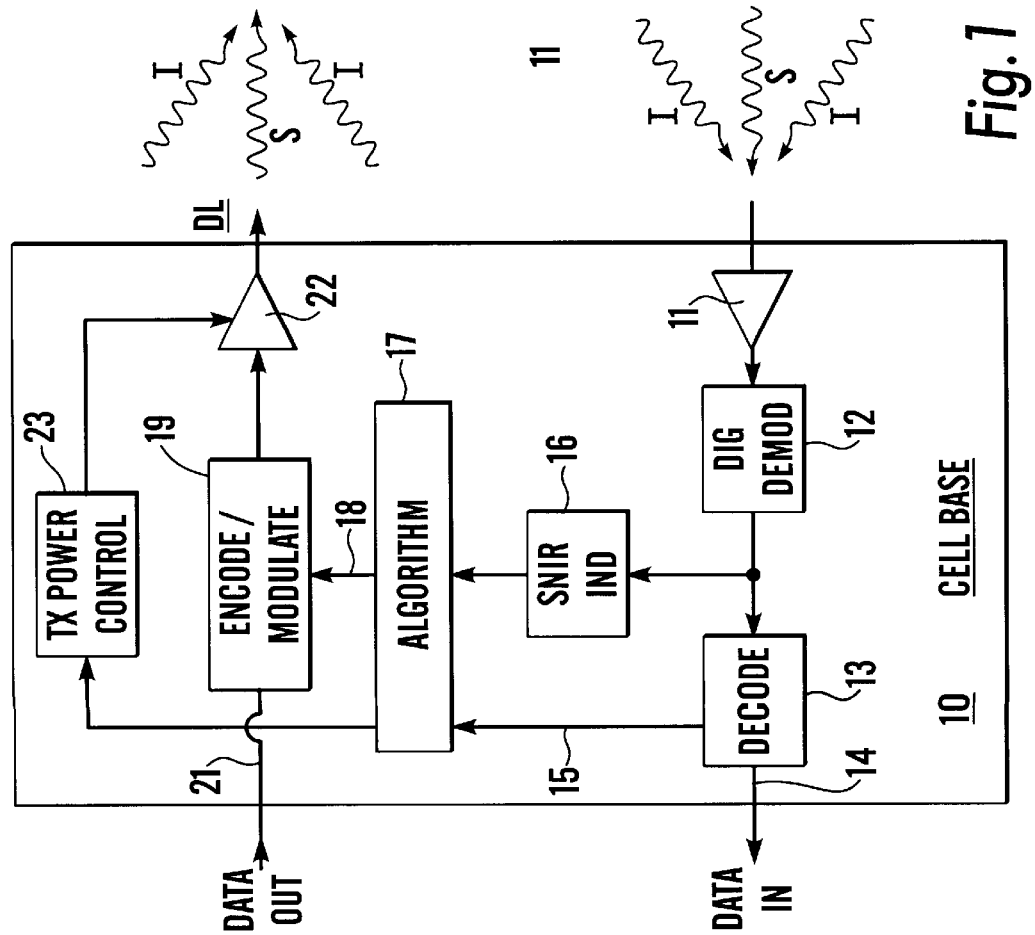

Referring to FIG. 1, communication within a digital cellular communication system is indicated in both directions between a cell base station 10 and a subscriber station 50, i.e. both up-link (UL) and down-link (DL), both shown with desired or message signal (S) and interference (I) components. To the extent that each of the stations 10 and 50 has similar provisions for the purposes of this embodiment of this invention, namely transmission power control. Thus, signal receiving amplifiers (indicated at 11 and 51) feed digital demodulators (12 and 52) connected separately to a decoder (13 and 53) for recovering message data (on 14 and 54) and transmit power control data (on 15 and 55), and to circuitry (16 and 56) for producing usable indication of SNIR. Typically, such SNIR indication will be provided on a frame-by-frame basis for received signals (UL and DL); and can readily be correlated with signal constellation, for example by way of estimated phase angle and/or jitter in such estimation of constellation point related to each demodulated symbol over the frame duration as an inference of SNIR without need for any direct measurement of actual levels of signal and/or interference or noise. This indication of received signal SNIR will be used by applying the desired generally progressive algorithm to generate transmit power control data for cell base 10 and subscriber 50 stations, but using algorithm application circuitry (17) conveniently and advantageously provided only at the cell station (10), see further below. The circuitry operative for computing base station and subscriber station transmit powers during the transmitting and receiving operations of the base station, respectively. Each of the cell base and subscriber stations (10 and 50) further includes encoding and modulating circuitry (19 and 58) operative on control data and/or SNIR indication as well as on message data (at 21 and 61) to be transmitted by way of a variable amplifier (22 and 62) controlled by output of power level control circuitry (23 and 63).

At the cell base station 10, circuitry 16 uses jitter in estimation of constellation point related to each digitally demodulated symbol over relevant frame duration to infer SNIR in received signals (at amplifier 11); and algorithm applying circuitry 17 derives updating control data for subscriber transmit power and supplied at 18 for encoding, modulation and transmission to the subscriber station 50 where it is recovered at decoder 53 and applied at 55 to set/adjust subscriber transmit power at 63 and complete relevant power control loop for uplink or reverse link transmission.

At the subscriber station 50, the SNIR indication inferred at 56 for received signals goes at 56 to encoding and modulating circuitry 59 along with message data (at 61) to be transmitted by way of controlled power amplifier 62 to the cell base station 10 where it is demodulated and decoded (12 and 13) for passage at 15 to the algorithm applying circuitry 17 then serving to relay updating of cell base station transmit power set at 23 for the variable power transmit amplifier 22, in completing the control loop for downlink transmission.

Preferred algorithm implementation is as follows:

$$Pi(t+1)=Pi(t)[1+\alpha\{1/Ri(t)-1/Rd\}]$$

indicating that the power Pi(t) as previously set for the other station concerning the current time frame is to be adjusted according to a scaling factor $\alpha$ applied to difference between reciprocals of indication/inference of SNIR for the current received time frame Ri(t) and a preset reference Rd. The value of Rd has, of course, conveniently similarly indicative/inferential relation to a value of SNIR and desired minimum for the system concerned, though advantageously preferably not directly representative of such actual minimum, but rather of some value already somewhat enhanced, for example by up to about 3.5 dB or more, at least where steps of transmit power adjustment are of the order of from fractional dB, say plus or minus 0.5 or less, to plus or minus a few dB, say 2 dB or more, but less then the above enhancement. It is also intended that the scaling factor $\alpha$ be variable to improve convergence, though it should not exceed the value of Rd itself.

Figure 2:
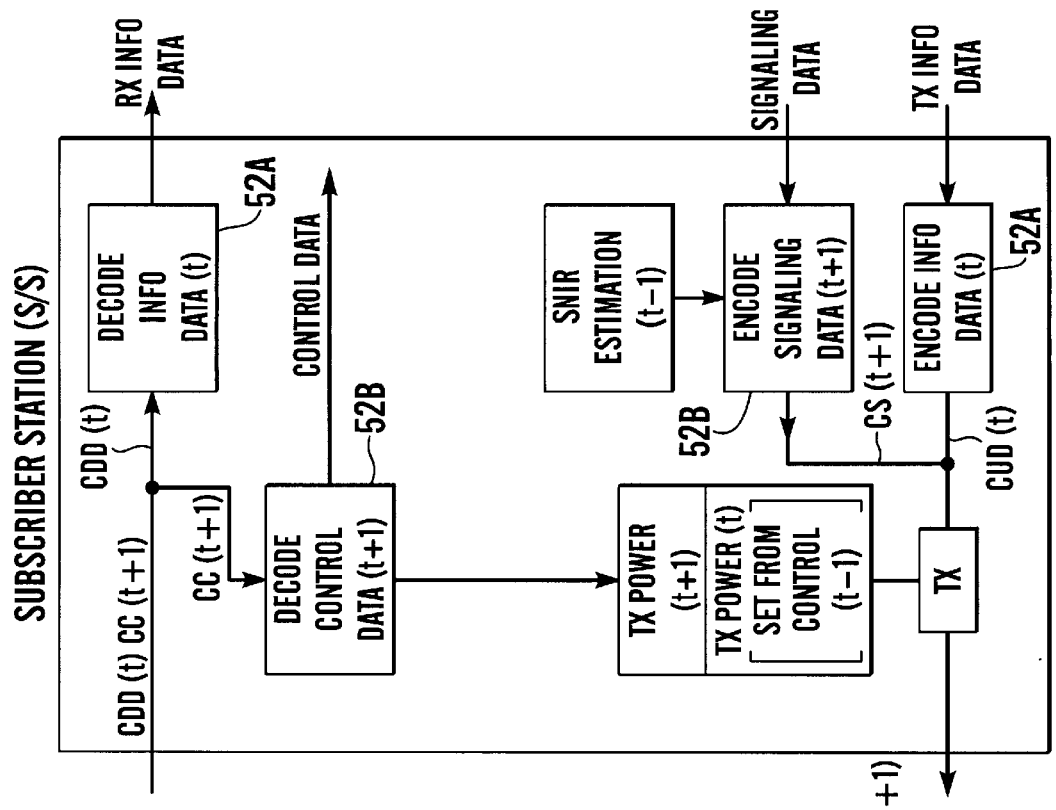
FIG. 2 is a block function diagram for a particular time frame t.
Figure 2:
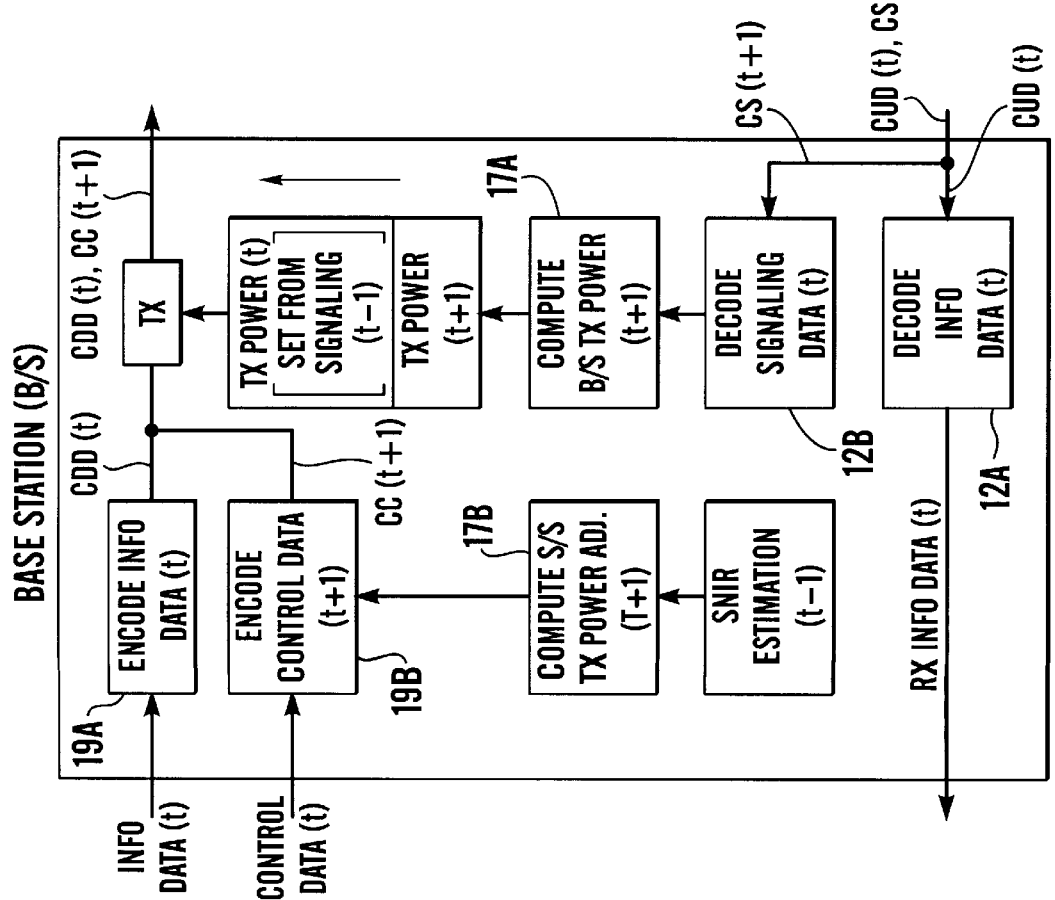

Turning now to FIG. 2, functions taking place in one time frame t of on-going down-link and up-link communication are intended to be represent by coded control and information blocks. This figure further shows flow of signalling and control data signals for encoding, thus encoding and decoding operations in blocks subscripted "A" and "B" and corresponding to information data signals and to other control data signals, including the power control data signals generated wholly at the base station, whether for up-link or down-link transmissions. Transmit power settings are shown notionally as function stacks supplying current time frame (t) power setting and receiving next time frame (t+1) power setting. Regarding abbreviations CDD(t) means coded down-link information data CUD(t) means coded up-link information data CC(t+1) means coded next frame control data Cs(t+1) means coded next frame signalling data and FIG. 2 is believed to be self-explanatory in light of its legends and description of FIG. 1.

One particular system analysis concerns a time division multiple access communication system having omnidirectional base stations in cells nominally 3 kilometers across, 700 kHz bearer bandwidths, 7 db log normal and otherwise Nortel Proximity I link budget including 20° beamwidth for subscriber antennae pattern. Allowing for a Gaussian distribution of error in estimating SNIR indications/inferences with 10% standard deviation and only using two control bits, i.e. for four levels of adjustment at +/− 0.5 dB and +/− 2 dB. Significant improvement was indicated at well over 90% of channels available compared with absence of power control and/or power control based on actual received signal strength at under 80%. Indeed, expressed as saving in spectrum that would otherwise be allocated to frequency re-use to achieve the same improvement, a factor of at least four arises.

For OCDMA systems, similar improvements should be available subject to the proviso that a significant interferer lingering in deep fade could significantly reduce channel availability, not being capable of remedy by slot shuffling.

Generally, it is envisaged that use of embodiments of this invention as both up-link and down-link can significantly enhance performance on the face of similar levels of interference, indicating trading between more aggressive frequency re-use and maintaining higher than hitherto normal 90% coverage for the same frequency re-use. In particular, fast power control can be provided, adequate to track temporal fades from frame to frame, and to cope well with adjacent channel interference, at least for communication systems having substantially or relatively fixed rather than mobile, perhaps particularly highly mobile, subscriber units or stations.

Power control hereof can be initiated with a higher power level during call set-up, at least in the event of initial failure at the last used level. Such procedures would naturally follow on for a traffic channel if access and call set-up channels are in-band, at least on a first-guess basis.

I claim:

1. Multichannel communications system having transmit power control means for each channel, such transmit power control means including provision for progressive approach towards a preset or given minimum of signal (or carrier) to noise plus interference ratio (SNIR) for the active channel concerned, wherein said provision is operative in each frame always by less than full difference between received SNIR and said preset or given minimum.

2. System according to claim 1, wherein said provision includes means operative in steps from frame to frame of system transmissions.

3. System according to claim 1, wherein said provision is operative in each frame according to signals as received in the previous frame.

4. System according to claim 1, wherein said provision is operative in each frame according to a scaling of difference between reciprocals of previous frame actual and preset or given minimum SNIRs.

5. System according to claim 4, wherein said scaling factor is not greater than the said preset or given minimum value.

6. System according to claim 5, wherein said that both of said preset or given minimum SNIR and said scaling factor are varied and selected according to desired effectiveness.

7. System according to claim 1, wherein said system has plural subscriber stations and communication via a base station, all of said stations each have transmit power adjusting means and means for providing indication of received SNIR, but only said base station has means serving to generate successive steps of said progressive approach.

8. System according to claim 7, wherein said means at said base station for generating said successive steps of is operative for both of its own said transmit power adjusting means in communication involving any particular said substation and by transmission for the transmit power adjusting means of that particular substation.

9. System according to claim 1, wherein all of base and subscriber stations include digital demodulating means, and means for producing estimation of SNIR in each frame for use in power control for the next frame, say by reference relative to the constellation point related to each demodulated symbol, each subscriber station has encoding and digital modulation means for transmitting its said estimation of SNIR to said base station along with information and any other control data to be communicated, said base station has means for producing its own and each subscriber station's desired adjustment to transmit power level to be encoded and digitally modulated together with information and any other control data to be communicated to the subscriber station concerned.

10. Method of multichannel communication wherein transmit power is controlled for each channel to achieve progressive power is controlled for each channel to achieve progressive approach towards a preset or given minimum of signal (or carrier) to noise plus interference ratio (SNIR) for any active channel concerned, wherein each said step in each said frame is deliberately always less than full difference between received SNIR and said preset or given minimum.

11. Method according to claim 10, wherein said progressive approach is by steps from frame to frame of transmissions.

12. Method according to claim 11, wherein said steps as applied in each frame are produced according to signals as received in the previous frame.

13. Method according to claim 11, wherein said steps for each frame are produced according to a scaling of difference between reciprocals of previous frame actual and preset or given minimum SNIRs.

14. Method according to claim 13, wherein said sealing factor is not greater than the said preset or given minimum value.

15. Method according to claim 14, wherein said that both of said preset or given minimum SNIR and said scaling factor are varied and selected according to desired effectiveness.

16. Method according to claims 11, wherein transmit power adjustment is done at all of plural subscriber stations and a base station involved in all communications, along with providing indication of SNIR as received, but generation of said successive steps for all stations is done only at said base station.

* * * * *